US012725599B2

(12) United States Patent
Rivera Benois et al.

(10) Patent No.: US 12,725,599 B2
(45) Date of Patent: Sep. 1, 2026

(54) ROBUST ACTIVE NOISE CANCELLING AT THE EARDRUM

(71) Applicant: Starkey Laboratories, Inc., Eden Prairie, MN (US)

(72) Inventors: Piero Iared Rivera Benois, Bad Zwischenahn (DE); Henning Schepker, Oldenburg (DE); Masahiro Sunohara, Plymouth, MN (US); Martin McKinney, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 424 days.

(21) Appl. No.: 18/453,900

(22) Filed: Aug. 22, 2023

(65) Prior Publication Data

US 2024/0078993 A1 Mar. 7, 2024

Related U.S. Application Data

(60) Provisional application No. 63/401,368, filed on Aug. 26, 2022.

(51) Int. Cl.
*H04R 25/00* (2006.01)
*G10K 11/178* (2006.01)

(52) U.S. Cl.
CPC ..... *G10K 11/17821* (2018.01); *H04R 25/505* (2013.01); *G10K 2210/1081* (2013.01)

(58) Field of Classification Search
CPC ..... G10K 11/17821; G10K 2210/1081; G10K 11/17815; G10K 11/17817;
(Continued)

(56) References Cited

U.S. PATENT DOCUMENTS 9,143,858 B2 9/2015 Alves et al.
9,215,749 B2 12/2015 Miller
(Continued)

FOREIGN PATENT DOCUMENTS

WO 2015010722 1/2015

*Primary Examiner* — Carolyn R Edwards
*Assistant Examiner* — Friedrich Fahnert
(74) *Attorney, Agent, or Firm* — Schwegman Lundberg & Woessner, P.A.

(57) ABSTRACT

Disclosed herein, among other things, are systems and methods for active noise cancellation (ANC) for hearing device applications. A method includes measuring a receiver-to-inward-facing microphone response during an in-situ calibration stage for the hearing device, estimating a receiver-to-eardrum transfer function using the measured receiver-to-inward-facing microphone response, and measuring an outward-facing microphone to inward-facing microphone transfer function for an external noise sound field during run-time operation of the hearing device. The method also includes estimating an inward-facing microphone to eardrum transformation for the external noise sound field in the inward-facing microphone using the measured outward-facing microphone to inward-facing microphone transfer function, computing an ANC controller using the estimated receiver-to-eardrum transfer function and the estimated inward-facing microphone to eardrum transformation, and cancelling acoustic noise for the hearing device using the ANC controller.

20 Claims, 6 Drawing Sheets

(58) Field of Classification Search
CPC ..... G10K 11/17881; G10K 2210/3033; G10K 2210/3035; G10K 2210/504; H04R 25/505; H04R 2460/01; H04R 25/554; H04R 1/1083
USPC ........................................................ 381/71.1
See application file for complete search history.

(56) References Cited

U.S. PATENT DOCUMENTS

| | | | | |
|---|---|---|---|---|
| 9,467,776 | B2 | 10/2016 | Miller et al. | |
| 9,516,407 | B2 | 12/2016 | Goldstein et al. | |
| 9,633,646 | B2 | 4/2017 | Hendrix et al. | |
| 10,586,523 | B1 * | 3/2020 | Kohler ............ | G10K 11/17854 |
| 12,302,057 | B1 * | 5/2025 | Chen .................... | H04R 1/1016 |
| 2014/0341388 | A1 * | 11/2014 | Goldstein ........ | G10K 11/17827 381/71.11 |
| 2016/0330546 | A1 * | 11/2016 | Barrentine ....... | G10K 11/17857 |

* cited by examiner

ROBUST ACTIVE NOISE CANCELLING AT THE EARDRUM

CLAIM OF PRIORITY AND INCORPORATION BY REFERENCE

The present application claims the benefit under 35 U.S.C. § 119(e) of U.S. Provisional Patent Application 63/401,368, filed Aug. 26, 2022, the disclosure of which is hereby incorporated by reference herein in its entirety.

TECHNICAL FIELD

This document relates generally to hearing device systems and more particularly to active noise cancellation (ANC) at the eardrum of a wearer of a hearing device.

BACKGROUND

Examples of hearing devices, also referred to herein as hearing assistance devices or hearing instruments, include both prescriptive devices and non-prescriptive devices. Specific examples of hearing devices include, but are not limited to, hearing aids, headphones, assisted listening devices, and earbuds.

Hearing aids are used to assist patients suffering hearing loss by transmitting amplified sounds to ear canals. In one example, a hearing aid is worn in and/or around a patient's ear. Hearing aids may include processors and electronics that improve the listening experience for a specific wearer or in a specific acoustic environment.

Hearing aids may include an active noise canceller used to actively suppress acoustic noise at the ears of the wearer. The active noise canceller generates a sound pressure wave that destructively overlaps with a sound pressure wave of an external noise source at a desired location. Standard noise cancellers aim at cancelling acoustic noise at a location remote from the eardrum of the patient, such as at a location of a microphone. However, this neglects the difference in sound pressure between the location of the microphone and the eardrum, which can lead to sub-optimal cancellation of acoustic noise at the eardrum. Improved methods of active noise cancellation are needed.

SUMMARY

Disclosed herein, among other things, are systems and methods for active noise cancellation (ANC) for hearing device applications. A method includes measuring a receiver-to-inward-facing microphone response during an in-situ calibration stage for the hearing device, estimating a receiver-to-eardrum transfer function using the measured receiver-to-inward-facing microphone response, and measuring an outward-facing microphone to inward-facing microphone transfer function for an external noise sound field during run-time operation of the hearing device. The method also includes estimating an inward-facing microphone to eardrum transformation for the external noise sound field in the inward-facing microphone using the measured outward-facing microphone to inward-facing microphone transfer function, computing an ANC controller using the estimated receiver-to-eardrum transfer function and the estimated inward-facing microphone to eardrum transformation, and cancelling acoustic noise for the hearing device using the ANC controller.

Various aspects of the present subject matter include a hearing device including a receiver, an inward-facing microphone, an outward-facing microphone, a memory, and one or more processors. The one or more processors are programmed to measure a receiver-to-inward-facing microphone response during an in-situ calibration stage for the hearing device, estimate a receiver-to-eardrum transfer function using the measured receiver-to-inward-facing microphone response, and measure an outward-facing microphone to inward-facing microphone transfer function for an external noise sound field during run-time operation of the hearing device. The one or more processors are also programmed to estimate an inward-facing microphone to eardrum transformation for the external noise sound field in the inward-facing microphone using the measured outward-facing microphone to inward-facing microphone transfer function, compute an ANC controller using the estimated receiver-to-eardrum transfer function and the estimated inward-facing microphone to eardrum transformation, and cancel acoustic noise for the hearing device using the ANC controller.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
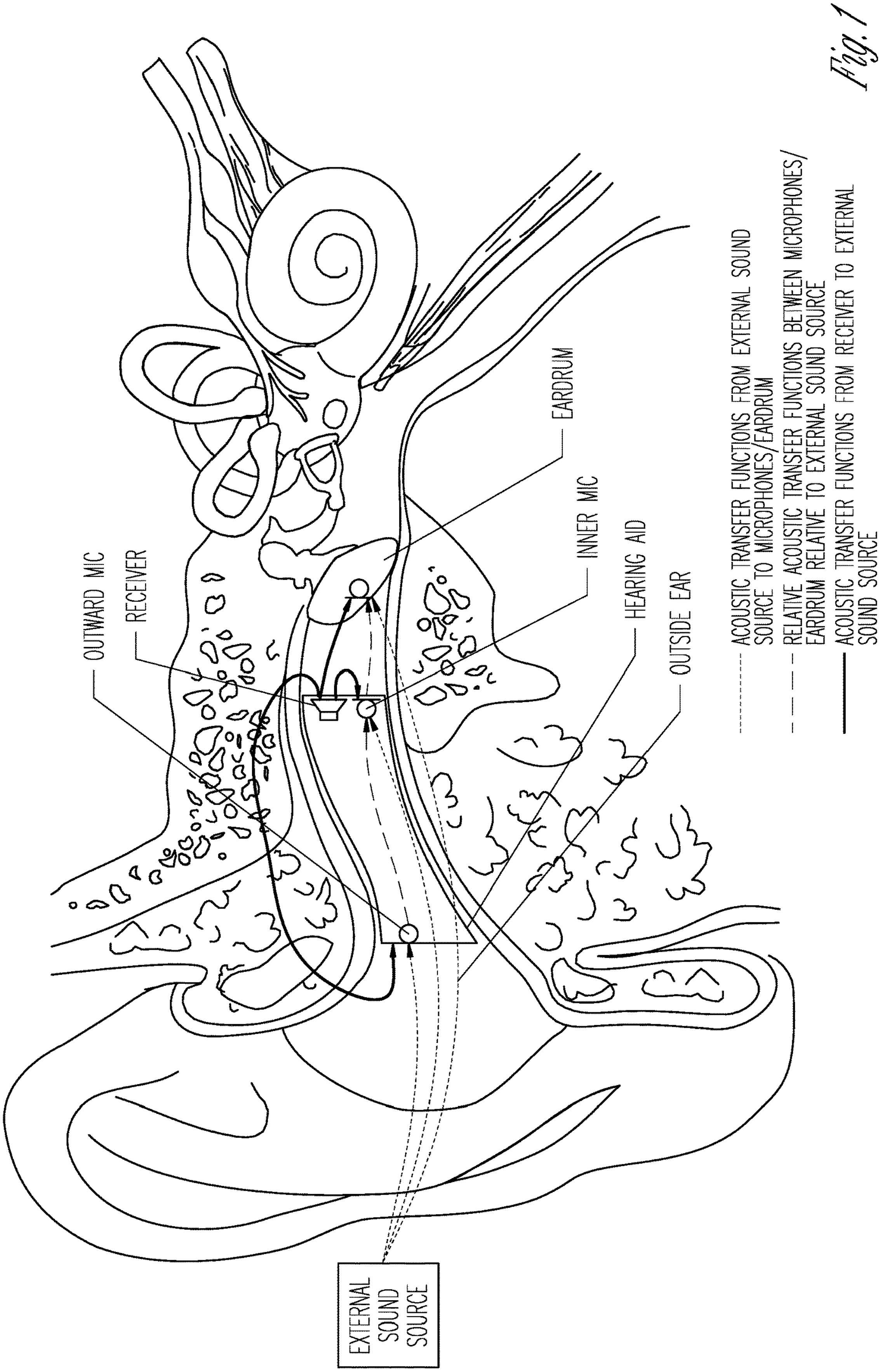
FIG. 1 illustrates a system for robust active noise cancelling at the eardrum for a hearing device, according to various examples of the present subject matter.

The following detailed description of the present subject matter refers to subject matter in the accompanying drawings which show, by way of illustration, specific aspects and examples in which the present subject matter may be practiced. These examples are described in sufficient detail to enable those skilled in the art to practice the present subject matter. References to "an", "one", or "various" examples or embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing devices generally, including earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

The present subject matter provides for active noise cancellation (ANC) of acoustic noise at the eardrum. This subject matter is useful in contexts where there is a high level of noise present in the environment, leading to high noise levels as at the eardrum. While the noise problem may be improved by fully occluding the ear, such as by using passive sound reduction, additional active suppression of sound leaking into the ear canal can further reduce the acoustic noise. Active suppression refers herein to the process where a sound is generated in the hearing devices that adds up destructively, such as with a 1800 phase shift, with the sound leaking into the ear canal. In various examples, active control of the sound uses a device that is equipped with a receiver and at least an inward-facing microphone.

An optimization procedure is provided to compute an ANC controller and internal models of the acoustic transfer functions around the ear exploiting both an inward-facing microphone, an outward facing microphone as well as prior knowledge about the acoustic paths and their variability.

Previous systems for ANC controllers aimed at cancelling the acoustic noise at the location of inward-facing microphone or were optimized at the eardrum during a calibration stage by assuming a constant noise sound field, i.e., a diffuse noise sound field. However, these previous systems neglected the difference in sound pressure between the location of the inward-facing microphone and the eardrum, which can lead to sub-optimal cancellation of the acoustic noise at the eardrum. In addition, previous ANC controllers are sub-optimal for any other noise sound field, such as a sound field generated by a moving directional noise source or a combined sound field with directional and diffuse components. The present subject matter re-optimizes an ANC controller upon changes in the noise sound field by exploiting an outward-facing microphone, in various examples.

Using the outward-facing microphone and the inward-facing microphone, the present subject matter obtains an estimate of the sound pressure generated by the external noise source at the eardrum which may be utilized in the optimization of the ANC controller to reduce the acoustic noise. Similarly, using the inward-facing microphone, the present system obtains an estimate of the sound pressure generated by the receiver at the eardrum, which may be used to directly cancel the acoustic noise at the eardrum and thus leads to an improved cancellation performance. Thus, the present subject matter provides improvements of an ANC system by controlling the pressure at the eardrum, in contrast to the conventional control of the sound pressure at the inward-facing microphone.

The robustness of the ANC controller against changes in the acoustic paths, such as due to small movements of the device in the ear or reinsertion of the device in the ear as well as variability in the spatial characteristics (location, diffuseness, etc.) of the acoustic noise source, may be improved by integrating knowledge of the variability in the ANC controller design. This variability can be estimated in several ways: by repeated measurements at the ear of the user during an in-situ calibration stage; from (the statistical analysis of) a database of repeated measurements at the same ear for several individuals during a training stage; or by utilizing models (e.g., 1-dimensional electro-acoustic models, 2-dimensional/3-dimensional finite element models) of the hearing device and the individual ear canal introducing slight changes to the ear canal geometry (length, diameter), the receiver response, or microphone responses.

Additionally, the robustness of the ANC controller against measurement uncertainty during the in-situ calibration of the controller, for example due to high environmental noise, movement of the device, and/or body sounds, can be improved by measuring the coherence during the identification of the acoustic paths. Furthermore, knowledge of the expected uncertainty of the measurement (such as from a training stage in several adverse conditions) can be utilized to shape the identification signal to reduce uncertainty and consequently improve the performance of the ANC controller.

Various examples include measuring the receiver-to-inward-facing microphone response during an in-situ calibration stage, using the measured receiver-to-inward-facing microphone response estimate the receiver-to-eardrum transfer function, measuring the outward-facing microphone to inward-facing microphone transfer function for an external noise sound field during run-time operation, using the measured outward-facing-to-inward-facing microphone transfer function estimate an inward-facing microphone to eardrum transformation for the external noise sound field in the inward-facing microphone, using these estimates and estimates of the variability of these estimates or their underlying acoustic paths compute an ANC controller, and using the same estimates and estimates of variability update the internal models of the acoustic paths.

FIG. 1 illustrates a system for robust active noise cancelling at the eardrum for a hearing device, according to various examples of the present subject matter. The system may include a receiver, an inner microphone or inward-facing microphone, and an outward microphone or outward-facing microphone. The present subject matter may use outward microphone to inward microphone to estimate inward microphone to eardrum acoustic properties. The present system trains a model, such as an internal model of the inward-microphone-to-eardrum transfer function for the external sound source, and uses the model to develop a better estimate of $\hat{M}(z)$ in FIG. 2B.

Figure 2A:
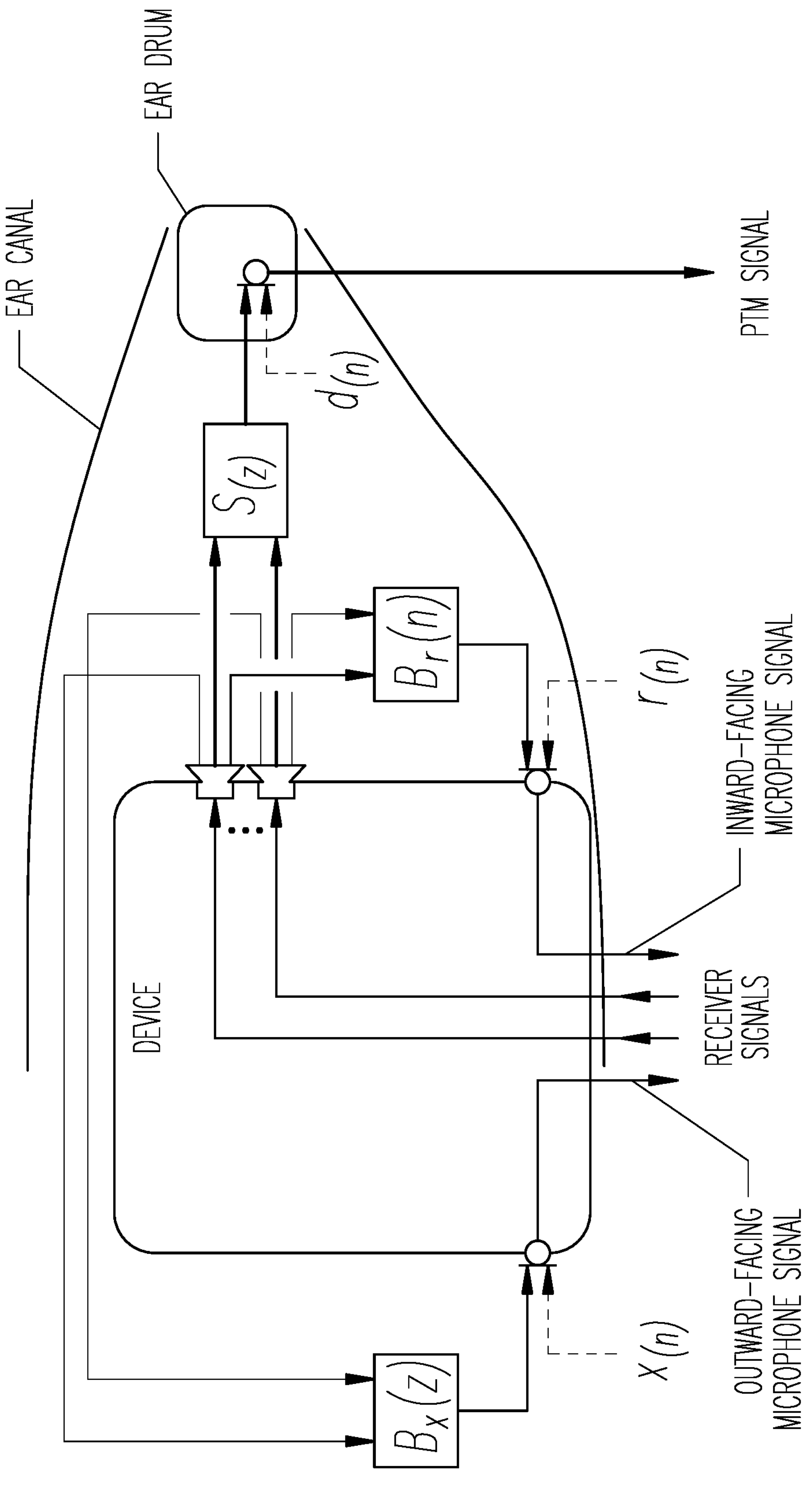
FIG. 2A illustrates a system for robust active noise cancelling at the eardrum during a calibration or training stage for a hearing device, according to various examples of the present subject matter.

FIG. 2A illustrates a system for robust active noise cancelling at the eardrum during a calibration or training stage for a hearing device, according to various examples of the present subject matter. The present system for active noise cancellation may use a two-stage approach. In a first stage, called either calibration or training stage, a probe tube microphone (PTM) is placed at the eardrum as shown in FIG. 2A. In the next step, an in-ear hearing device (such as a headphone or hearing aid or other head-worn or ear-worn device) is inserted into the ear canal and an acoustic path between the receivers and the eardrum, called the secondary path S(z), is measured. Subsequently, a calibration noise field is generated around the user to measure the transfer function:

$$\hat{M}(z)=\hat{\Phi}_{dr}(z)/\hat{\Phi}_{rr}(z)$$

between the inward-facing microphone and eardrum and the transfer function:

$$\hat{Q}(z)=\hat{\Phi}_{rx}(z)/\hat{\Phi}_{xx}(z)$$

between the outward-facing microphone and the inward-facing microphone, where $\hat{\Phi}_{dr}(z)$, $\hat{\Phi}_{rx}(z)$, $\hat{\Phi}_{xx}(z)$ and $\hat{\Phi}_{rr}(z)$ denote the cross- and auto-correlation functions in the z-transform domain estimated from the signals measured at the outward-facing microphone, the inward-facing microphone and the PTM (eardrum). After removing the PTM, the in-ear hearing device is reinserted and the acoustic path between the receivers and the inward-facing microphone, called the inward feedback path $B_r(z)$, and the acoustic path between the receivers and the outward-facing microphone, called the outward feedback path $B_x(z)$, are measured. These measurements can be repeated in-situ with the same subject in the calibration stage and or repeated at the same ear for several individuals during the training stage to generate a dataset of measured acoustic paths and their measurement variability and uncertainty. Alternatively, these measurements can be avoided by utilizing models (e.g., 1-dimensional electro-acoustic models, 2-d/3-d finite element models) of the hearing device and the individual ear canal introducing slight changes to, e.g., the ear canal geometry (length, diameter), the receiver response, and microphone responses.

In various examples, using the measured or modelled acoustic transfer functions and measurement variability and uncertainty, the internal models $\tilde{S}(z)$, $\tilde{M}(z)$, $\tilde{B}_x(z)$ and $\tilde{B}_r(z)$ and the controller W(z) are calculated.

Figure 2B:
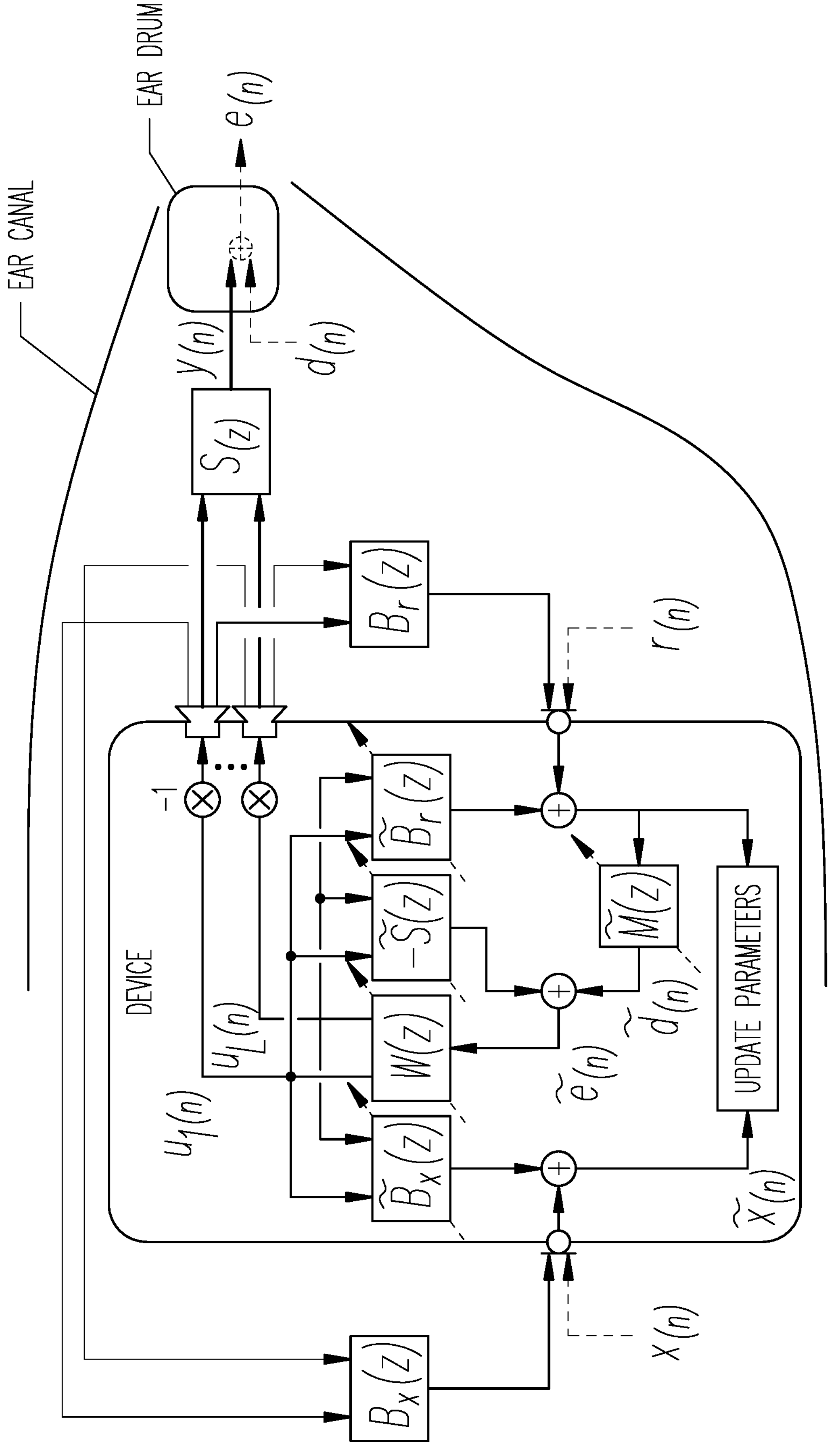
FIG. 2B illustrates a system for robust active noise cancelling at the eardrum during a control stage for a hearing device, according to various examples of the present subject matter.

FIG. 2B illustrates a system for robust active noise cancelling at the eardrum during a control stage for a hearing device, according to various examples of the present subject matter. During the second stage, called control stage, the internal models $\tilde{S}(z)$, $\tilde{M}(z)$, $\tilde{B}_x(z)$ and $\tilde{B}_r(z)$ are integrated in a virtual sensing algorithm as the one depicted in FIG. 2B to make an on-line estimation of the sound pressure at the eardrum e(n), following a three-step approach. First, $\tilde{B}r(z)$ is used to estimate r(n) by compensating the estimated sound pressure generated by the receivers of the hearing device at the position of the inward-facing microphone from the microphone signal. Second, the internal model $\tilde{M}(z)$ is used to calculate the estimated incident noise at the eardrum $\tilde{d}(n)$, based on the estimated sound pressure at the inward-facing microphone $\tilde{r}(n)$. Third, the estimated sound pressure at the eardrum $\tilde{e}(n)$ with ANC "on" is estimated by using the estimated sound pressure generated by the incident noise at the eardrum $\tilde{d}(n)$ and the internal model $\tilde{S}(z)$. The estimated sound pressure at the eardrum $\tilde{e}(n)$ can be used as input for the controller W(z), as suggested in FIG. 2B. The present system measures the outward-facing microphone to inward-facing microphone transfer function $\tilde{Q}(z)=\hat{\Phi}_{\tilde{r}\tilde{x}}(Z)\hat{\Phi}_{\tilde{x}\tilde{x}}(z)$ during run-time operation, by using the estimated sound pressures $\tilde{x}(n)$ and $\tilde{r}(n)$ generated by the incident noise at the outward-facing and inward-facing microphones, respectively. Using the measured transfer function $\hat{Q}(z)$, the present system updates the internal models $\tilde{S}(z)$, $\tilde{M}(z)$, $\tilde{B}_x(z)$ and $\tilde{B}_r(z)$. Using the updated internal models and their measurement variability and uncertainty, i.e. for the secondary path S(z) the uncertainty $\hat{U}_l(\Omega_k)$ per receiver channel 1 over frequency, the present system recalculates the controller W(z). The present system may use an algorithm to enable the run-time update of $\tilde{B}_X(z)$ and $\tilde{B}_r(z)$ using, for example, additive white noise as measurement signal or decorrelation algorithms based on frequency shifting or pre-whitening.

ANC Controller Design

The following discussion refers to a current state of the art for ANC controller design. W(z) is a finite impulse response (FIR) filter with N filter coefficients stacked in the vector w. The filter coefficients are calculated by solving the convex maximization problem in the DFT domain:

$$w = \arg\max_{w} \sum_{k=0}^{\frac{L_{DFT}}{2}-1} \sum_{c=1}^{c} \left|W(\Omega_k)\hat{S}(\Omega_k, c)\right|^2 \left|\hat{M}_0(\Omega_k)\right|^2 G_1^2(\Omega_k), ,$$

where $\hat{S}(\Omega_k, c)$ denotes the measured frequency responses of the secondary path, $\hat{M}_0(\Omega_k)$ denotes the nominal frequency response of the system M(z) without causality restrictions, k denotes the frequency index, $L_{DFT}$ denotes the DFT length, $G_1(\Omega_k)$ denotes a frequency dependent function to weight the low frequencies more than the mid and high frequencies and the squared magnitude response of the internal model $|\hat{M}_0(\Omega_k)|^2$ is used to weight lower the frequencies that are attenuated by M(z).

Aiming at deriving a controller W(z) that yields a stable system, a stability constraint is imposed. The solution space is restricted by a single-sided hyperbolic boundary formulated as an inequality between quadratic terms as $$|\varrho - W(\Omega_k)\tilde{S}(\Omega_k)|^2 \leq (|\varrho + W(\Omega_k)\tilde{S}(\Omega_k)| + 2\cdot\rho)^2,$$

where $\varrho$ determines the focus $(-\varrho, 0)$ and ρ the x-axis intersect (−ρ,0) of the hyperbola. In addition, aiming at limiting the maximum gain of the controller W(z), the convex inequality constraint:

$$|W(\Omega_k)|^2 \leq G_3^2(\Omega_k)$$

is introduced, where $G_3(\Omega_k)$ denotes the maximum allowed gain. Feedback ANC approaches are generally subject to the water-bed effect (where noise is amplified outside the desired frequency band) and therefore prone to produce amplifications outside the attenuation bandwidth [7]. Aiming at restricting such amplification, the system introduces the following convex inequality constraint:

$$\left(\left|1 + W(\Omega_k)\tilde{S}(\Omega_k)\left(1 - \hat{M}(\Omega_k)/\hat{M}_o(\Omega_k)\right)\right| + \hat{U}_S(\Omega_k)\left|W(\Omega_k)\tilde{S}(\Omega_k)\right|\left|\hat{M}(\Omega_k)/\hat{M}_o(\Omega_k)\right|\right)^2 \leq G_2^2(\Omega_k)\left|1 + W(\Omega_k)\tilde{S}(\Omega_k)\right|^2$$

for the optimization, where $G_2(\Omega_k)$ denotes the maximum allowed amplification and $\hat{U}_s(\Omega_k)$ denotes the multiplicative uncertainty in the secondary path that is calculated as $$\hat{U}_S(\Omega_k) = \max_{c} \left|\frac{\tilde{S}(\Omega_k) - \hat{S}(\Omega_k, c)}{\tilde{S}(\Omega_k)}\right|.$$

This convex maximization problem subject to the aforementioned constraints can then be solved using SQP algorithms and running simulations to provide parameter optimization.

The present subject matter improves upon ANC controller design in various examples, such as described below.

1. Various aspects include run-time estimation of $\tilde{M}(z)$ and update of the ANC controller W(z). The run-time estimation of $\tilde{M}(z)$ allows to more accurately predict the sound pressure generated by the sound field at the eardrum and hence improves the suppression performance of the ANC controller. This may be implemented using:

a) A database best-match-indexing approach using $\hat{Q}(z)$ as input:

$$\hat{M}_0(z) = \text{database}_{Q2M}(\hat{Q}(z))$$

b) A model-based approach based on the transfer function between the outward-facing microphone and the eardrum, called primary path $P_T(z)=\hat{\Phi}_{dx}(z)/\hat{\Phi}_{xx}(z)$, measured during the calibration or training stage $$\hat{M}_0(z) = \frac{P_T(z)}{\hat{Q}(z)},$$

c) A database that uses the direction-of-arrival of the sound as index input, where different $\hat{M}_0(z)$ are stored for different direction of arrivals (DoA) for directional sound sources, which are estimated using $\hat{Q}(z)$ as input:

$$\hat{M}_0(z) = \text{database}_{DoA2M}(\text{DoA\_estimation}(\hat{Q}(z)))$$

Using either of these three alternatives to estimate the nominal transfer function $\hat{M}(z)$, the internal model $\tilde{M}(z)$ is calculated using the least-squares-optimal causal estimation of $\ddot{M}_0(z)$ by $$\tilde{M}(z) = \{\hat{M}_0(z)\}_+$$

Finally, the updated $\hat{M}_0(z)$ and M(z) are used to recalculate W(z) during run-time.

2. Various aspects include run-time estimation of $\tilde{B}_r(z)$ leading to an update of $\tilde{S}(z)$ and recalculation of the ANC controller. The run-time estimation of $\tilde{B}_r(z)$ and subsequent updating of $\tilde{S}(z)$ allows to more accurately predict the sound pressure generated by the hearing device receiver at the eardrum and also to recalculate the controller W(z), thus increasing the suppression performance of the ANC controller.

This may be implemented using:

a) A database best-match-indexing approach using $\hat{B}(z)$ as input:

$$\tilde{S}(z) = \text{database}_{B2S}(\hat{B}_r(z))$$

b) A model-based approach based on the transfer function $H_T(z)=\hat{S}(z)/\hat{B}_r(z)$, measured during the calibration or training stage $$\tilde{S}(z) = H_T(z)\cdot(\hat{B}_r(z)),$$

c) A database that uses an electro acoustic model to estimate S(z) based on the run-time estimation of $\hat{B}_r$ by $$\tilde{S}(z) = EAModel_{B_r2S}(\hat{B}_r(z))$$

Using either of these three alternatives to estimate the internal model $\tilde{S}(z)$ leads to the recalculation of the ANC controller W(z) during run-time.

3. Various aspects include run-time updates to the controller W(z) computed at different time instances, e.g., a) Every time the internal models are updated, i.e., every sample. In order to save computational resources, an update to the controller can only be done every couple of 100 ms or even seconds, assuming that the acoustics paths do not change significantly over this period of time.

b) Every time there is a significant change of the internal models, e.g., when the internal model has changes by a predefined margin from the internal model that was used to compute the previous controller.

Run-time updates of the controller allow the controller to be optimally adjusted to changes in the acoustic of the ear canal and the sound field, hence improving the time-dependent suppression performance. Depending on the computational complexity and the update rate of the controller, updates of the controller may be computed on an external device that is wirelessly coupled to the hearing device.

4. Various aspects include improved robustness by considering acoustic variability and measurement uncertainty in the cost function $$w = \arg\max_{w} \sum_{k=0}^{\frac{L_{DFT}}{2}-1} \sum_{r=1}^{R} \left|W(\Omega_k)\hat{S}(\Omega_k, r)\right|^2 \left|\hat{M}_0(\Omega_k)\right|^2 \frac{1}{\beta(\Omega_k) + U_M^2(\Omega_k)} G_1^2(\Omega_k),$$

where $\beta(\Omega_k)$ denotes a frequency-dependent variable to avoid division by zero, and the uncertainty $$U_M^2(\Omega_k)$$

related to M(z) can be understood as either the uncertainty about the sound-field, e.g., when the acoustic sound field is changing or the device is (re-)inserted, the uncertainty of the measurements itself, or a combination thereof. While the uncertainty based on (re-)insertion variability can be derived from measurements during a separate training stage with multiple individuals and multiple sound fields using the multiplicative uncertainty model $$\hat{U}_M(\Omega_k) = \max_c \left|\frac{\tilde{M}(\Omega_k) - \hat{M}(\Omega_k, c)}{\tilde{M}(\Omega_k)}\right|,$$

or a standard deviation model $$\hat{U}_M(\Omega_k) = \sqrt{\frac{1}{C}\sum_{c=1}^{C} \left|\hat{M}(\Omega_k, c) - \tilde{M}(\Omega_k)\right|^2},$$

the uncertainty of the measurements itself may be obtained during run-time operation of the algorithm, e.g., using the magnitude-squared coherence (MSC) between the inward-facing microphone and the signal measured by the probe tube microphone at the eardrum.

Likewise, in situations when the uncertainty in the measurement of $B_r(z)$ increases, the uncertainty in S(z) increases as well. The mapping function that translates one uncertainty into the other can be derived during a training stage:

$$\hat{U}_s(\Omega_k) = \text{database}_{S2B}\left(\hat{U}_{B_r}(\Omega_k)\right)$$

5. In various examples, all of the above can be extended to the case of multiple (N) receivers, where the controller W(z) is a vector of N controllers, one for each receiver $$w = \underset{w}{\arg\max} \sum_{k=0}^{\frac{L_{DFT}}{2}-1} \sum_{r=1}^{R} \left|W^T(\Omega_k)\hat{S}(\Omega_k, r)\right|^2 \left|\hat{M}_0(\Omega_k)\right|^2 \frac{1}{\beta(\Omega_k) + U_M^2(\Omega_k)} G_1^2(\Omega_k),$$

$$\left(\left|1 + W^T(\Omega_k)\tilde{S}(\Omega_k)\left(1 - \tilde{M}(\Omega_k)/\hat{M}_0(\Omega_k)\right)\right| + \frac{1}{L}\sum\nolimits_{l=1}^{L} \hat{U}_{S,l}(\Omega_k)\right.$$

$$\left.\left|W^T(\Omega_k)\tilde{S}(\Omega_k)\right|\left|\tilde{M}(\Omega_k)/\hat{M}_0(\Omega_k)\right|\right)^2 \leq G_2^2(\Omega_k)\left|1 + W^T(\Omega_k)\tilde{S}(\Omega_k)\right|^2,$$

$$\left|\varrho - W^T(\Omega_k)\tilde{S}(\Omega_k)\right|^2 \leq \left(\left|\varrho + W^T(\Omega_k)\tilde{S}(\Omega_k)\right| + 2 \cdot \rho\right)^2,$$

$$|W_l(\Omega_k)|^2 \leq G_3^2(\Omega_k),$$

where $W_l(\Omega_k)$ denotes the frequency response of the controller W (z) at the $1^{th}$ receiver channel.

6. Various aspects may use knowledge of the expected uncertainty of the measurement (e.g., from a training stage in several adverse conditions) to shape the identification signals accordingly and consequently improve the performance of the ANC controller. The shaping can be a frequency weighting that, on the one hand, increases the level of the identification signal in frequency ranges where the measurements have shown to have low SNR under different adverse measurement conditions; and on the other hand, decreases the level of the identification signal in frequency ranges where the receiver or the microphone have shown certain degree of saturation i.e., generation of THD higher than the one allowed for the measurement.

Alternatively or additionally, the present system may be implemented using a feedforward approach. In various examples, updates for the ANC controller may be computed on an external device, e.g., a smartphone based on data (internal models) and wirelessly exchanged between the smartphone and the hearing device.

The present subject matter may use knowledge of receiver to inward microphone characteristics (e.g., if there is a notch.) as input for the recalculation of the ANC controller. For example, the device is placed in an ear of a user or patient, and the acoustic path is measured. If acoustic noise leaks into the ear due to open fit there may be some error or uncertainty in the measured receiver-to-inward-facing-microphone response. The present system may use this uncertainty as an input for the recalculation of the ANC controller.

A hearing device may be placed in a patient's ear, the sound pressure measured from an inner microphone to the eardrum by reinserting the device several times, and used to estimate in real time the sound pressure at the eardrum. This may be used as an internal model in the control stage to calculate a control signal that aims to minimize the sound pressure at the eardrum. A type of virtual sensing is used, as it is difficult to access the eardrum during runtime. The controller may be optimized for all use cases by including statistical variance, multiplicative uncertainty, and which frequency range varies the greatest. The present subject matter optimizes the ANC controller to provide broader attenuation bandwidth, and higher attenuation magnitude in almost all frequencies compared to previous methods. Alternatively or additionally, amplification is controlled at higher frequencies (based on passive attenuation).

The present subject matter may be used to improve accuracy of in situ measurements. Instead of requiring multiple reinsertions of the device and multiple measurements, the present subject matter provides for measuring once, and using prior knowledge of variability to adjust the resulting measurement.

The present subject matter may be used to track sound source location or sound field between inward facing and outward facing microphones, estimate during runtime, and use it to update the ANC controller to better suppress sound at the eardrum. In situ measurement assumes source location during measurement, but in an actual acoustic environment, sound source location varies. The present subject matter may use an outside microphone to estimate $\hat{M}(z)=\hat{\Phi}_{dr}(Z)/\hat{\Phi}_{rr}(z)$ (inner microphone to eardrum transfer function for the external sound source), and use the estimate to minimize the sound pressure at the eardrum generated by the external sound field that varies during runtime. For example, the present subject matter may generate a calibration sound field, and generate a database of different $\hat{M}(z)$ for different sound fields. The present system may exploit the external microphone (and the internal microphone) to estimate actual sound fields. Thus, the present system may determine the best parameters to minimize the sound pressure generated by an external sound field at the eardrum. The data may be stored on the device, such as in a lookup table, but may also be stored on an external device.

The present subject matter may be used for open fitting situations in which there is a high risk of background noise that may disturb accuracy of measurement. The present system may quantify uncertainty (coherence) and include the uncertainty in optimization for a specific user. The present system provides for adaptive updating of the ANC controller during runtime. The present system may be used with multiple receiver systems.

Figure 3A:
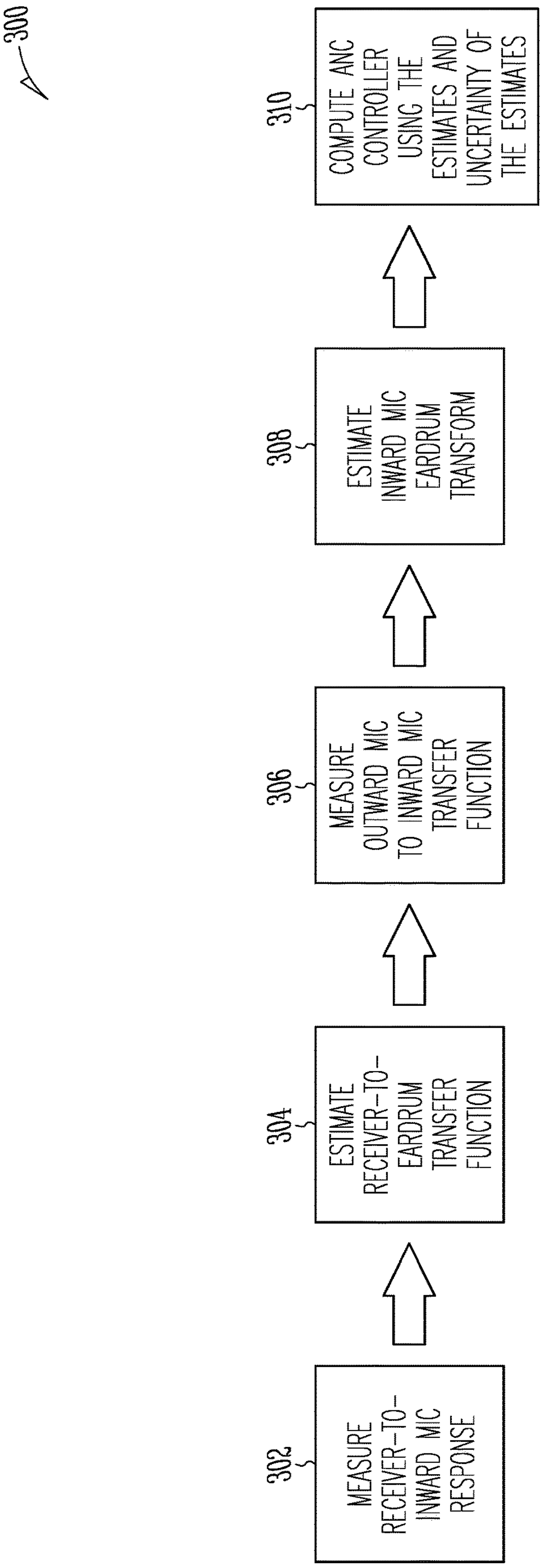
FIGS. 3A-3B illustrate flow diagrams of methods for robust active noise cancelling at the eardrum for hearing device applications, according to various examples of the present subject matter.
Figure 3B:
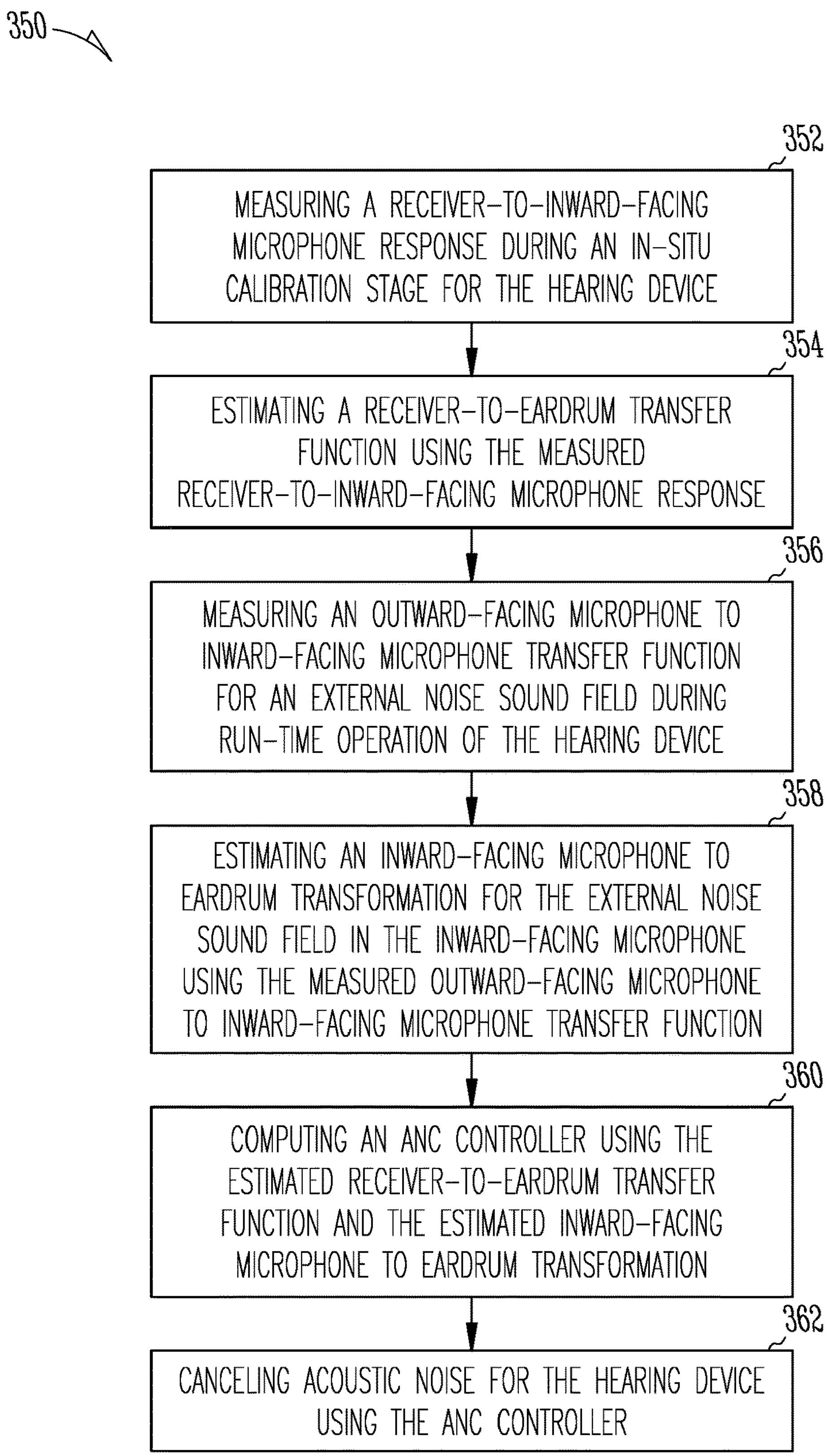

FIGS. 3A-3B illustrate flow diagrams of methods for robust active noise cancelling at the eardrum for hearing device applications, according to various examples of the present subject matter. In FIG. 3A, a method 300 includes measuring receiver-to-inward microphone response, at step 302, and estimating receiver-to-eardrum transfer function, at step 304. The method 300 further includes measuring an outward microphone to inward microphone transfer function, at step 306, and estimating an inward microphone to eardrum transformation, at step 308. At step 310, the method 300 includes computing an ANC controller using the estimates and uncertainty of the estimates. In various examples, uncertainty may originate from system variability and/or measurement error.

FIG. 3B illustrates a method 350 including measuring a receiver-to-inward-facing microphone response during an in-situ calibration stage for the hearing device, at step 352, estimating a receiver-to-eardrum transfer function using the measured receiver-to-inward-facing microphone response, at step 354, and measuring an outward-facing microphone to inward-facing microphone transfer function for an external noise sound field during run-time operation of the hearing device, at step 356. The method 350 also includes estimating an inward-facing microphone to eardrum transformation for the external noise sound field in the inward-facing microphone using the measured outward-facing microphone to inward-facing microphone transfer function, at step 358, computing an ANC controller using the estimated receiver-to-eardrum transfer function and the estimated inward-facing microphone to eardrum transformation, at step 360, and cancelling acoustic noise for the hearing device using the ANC controller, at step 362.

In various examples, computing the ANC controller includes using a computed variability of the estimated receiver-to-eardrum transfer function and the estimated inward-facing microphone to eardrum transformation. The method may further include updating internal models of acoustic paths within the hearing device using the estimated receiver-to-eardrum transfer function and the estimated inward-facing microphone to eardrum transformation, in various examples. The method may also include updating internal models of acoustic paths within the hearing device using the computed variability of the estimated receiver-to-eardrum transfer function and the estimated inward-facing microphone to eardrum transformation.

The present subject matter may estimate transfer functions using the methods described herein. Other methods of estimating transfer functions may be used without departing from the scope of the present subject matter. The present algorithm can be wholly or partially implemented within firmware of a hearing device.

Various examples include a hearing device including a receiver, an inward-facing microphone, an outward-facing microphone, a memory, and one or more processors. The one or more processors are programmed to measure a receiver-to-inward-facing microphone response during an in-situ calibration stage for the hearing device, estimate a receiver-to-eardrum transfer function using the measured receiver-to-inward-facing microphone response, and measure an outward-facing microphone to inward-facing microphone transfer function for an external noise sound field during run-time operation of the hearing device. The one or more processors are also programmed to estimate an inward-facing microphone to eardrum transformation for the external noise sound field in the inward-facing microphone using the measured outward-facing microphone to inward-facing microphone transfer function, compute an ANC controller using the estimated receiver-to-eardrum transfer function and the estimated inward-facing microphone to eardrum transformation, and cancel acoustic noise for the hearing device using the ANC controller.

The device also includes a wireless transceiver configured to communicate with the external device, in various examples. The wireless transceiver may include a Bluetooth® or Bluetooth® Low Energy (BLE) transceiver. Other types of wireless transceivers (or transmitters and receivers) may be used without departing from the scope of the present subject matter. In various examples, data is logged in an external storage location. The external storage location may include cloud storage, but other types of storage locations may be used without departing from the scope of the present subject matter. In various examples, the external device includes a smart phone or other computing device. Alternatively or additionally, the hearing device includes a hearing aid or other ear worn device, in various examples. The user's data and statistics are stored both on the hearing device and in a remote storage location, in various examples.

In binaural environments, the hearing device is configured to communicate with a second hearing device (such as in the opposite ear of the user) to coordinate adjustments and recommendations between left and right devices. Alternatively or additionally, each device performs ANC separately. Alternatively or additionally, one device acts as a master device to control adjustments and recommendations for the other device. Alternatively or additionally, the device communicates with a separate body worn device to provide processing of the methods of the present subject matter, with or without communicating with the external device.

The present subject matter provides for robust active noise cancelling at the eardrum. The present subject matter is superior to previous solutions that aimed at cancelling acoustic noise at a location remote from the eardrum of the patient, such as at a location of a microphone. These previous solutions neglect the difference in sound pressure between the location of the microphone and the eardrum which can lead to sub-optimal cancellation of acoustic noise at the eardrum. The present subject matter provides for active acoustic noise cancellation using both an inward-facing microphone, an outward facing microphone as well as prior knowledge about the acoustic paths and their variability. Other parameters and/or operational characteristics of the hearing device may be adjusted (or recommended to be adjusted) without departing from the scope of the present subject matter.

Figure 4:
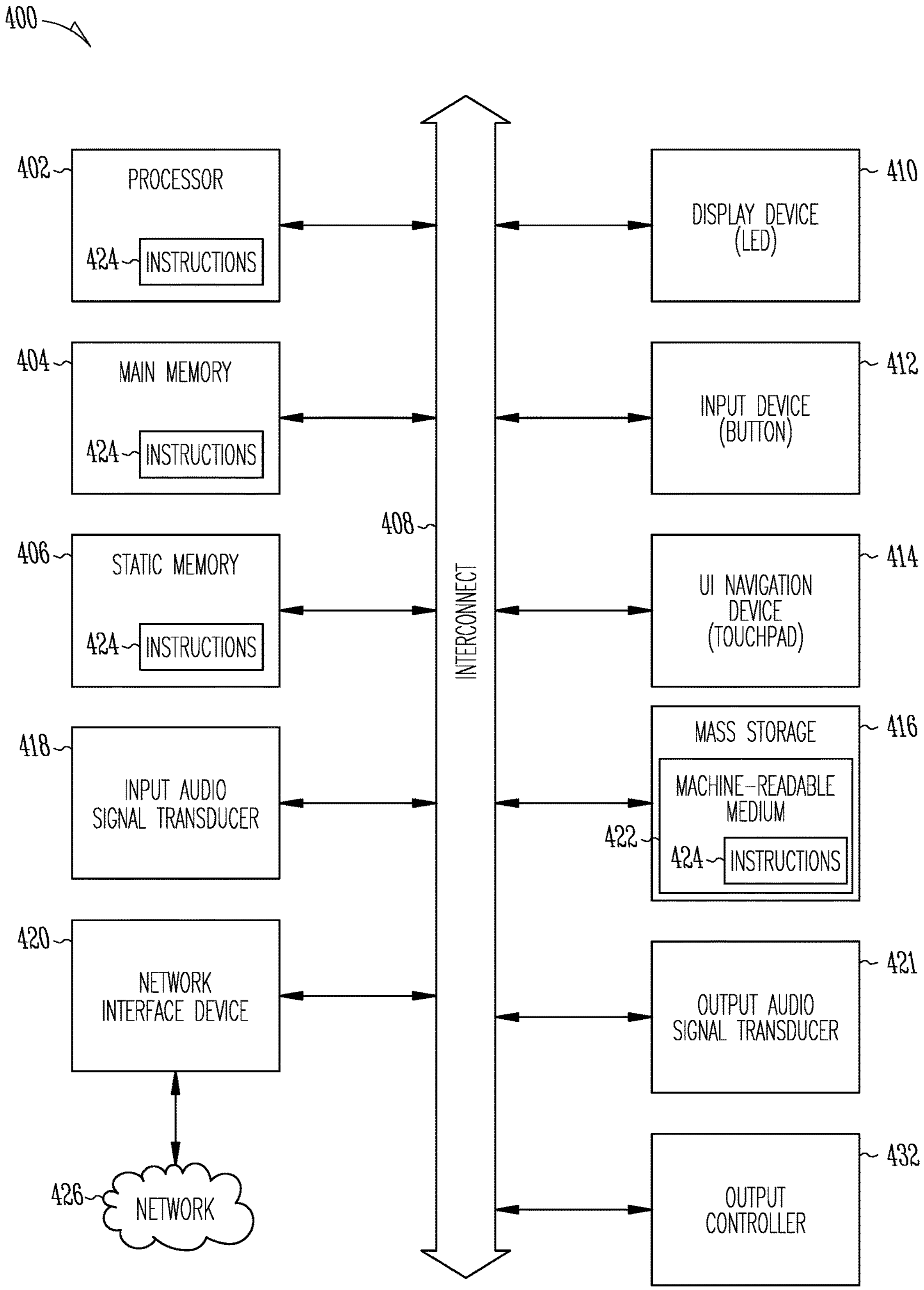
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. Alternatively or additionally, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation.

Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other manageable medium to facilitate communication of such software.

Various examples of the present subject matter support wireless communications with a hearing device. In various examples the wireless communications may include standard or nonstandard communications. Some examples of standard wireless communications include link protocols including, but not limited to, Bluetooth™, Bluetooth™ Low Energy (BLE), IEEE 802.11(wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various examples, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various examples, the battery is rechargeable. In various examples multiple energy sources are employed. It is understood that in various examples the microphone is optional. It is understood that in various examples the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using sub-band processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various examples of the present subject matter the processor is adapted to perform instructions stored in one or more memories, which may or may not be explicitly shown. Various types of memory may be used, including volatile and nonvolatile forms of memory. In various examples, the processor or other processing devices execute instructions to perform a number of signal processing tasks. Such examples may include analog components in communication with the processor to perform signal processing tasks, such as sound reception by a microphone, or playing of sound using a receiver (i.e., in applications where such transducers are used). In various examples of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in bone conduction hearing devices, in some examples. The present subject matter may be used in devices whether such devices are standard or custom fit and whether they provide an open or an occlusive design. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method for active noise cancellation (ANC) for a hearing device including a receiver, an inward-facing microphone, and an outward-facing microphone, the method comprising:

measuring a receiver-to-inward-facing microphone response during an in-situ calibration stage for the hearing device;

estimating a receiver-to-eardrum transfer function using the measured receiver-to-inward-facing microphone response;

measuring an outward-facing microphone to inward-facing microphone transfer function for an external noise sound field during run-time operation of the hearing device;

estimating an inward-facing microphone to eardrum transformation for the external noise sound field in the inward-facing microphone using the measured outward-facing microphone to inward-facing microphone transfer function;

computing an ANC controller using the estimated receiver-to-eardrum transfer function and the estimated inward-facing microphone to eardrum transformation; and cancelling acoustic noise for the hearing device using the ANC controller.

2. The method of claim 1, wherein computing the ANC controller includes using a computed variability of the estimated receiver-to-eardrum transfer function and the estimated inward-facing microphone to eardrum transformation.

3. The method of claim 2, further comprising:

updating internal models of acoustic paths within the hearing device using the computed variability of the estimated receiver-to-eardrum transfer function and the estimated inward-facing microphone to eardrum transformation.

4. The method of claim 1, further comprising:

updating internal models of acoustic paths within the hearing device using the estimated receiver-to-eardrum transfer function and the estimated inward-facing microphone to eardrum transformation.

5. The method of claim 1, further comprising logging the receiver-to-inward-facing microphone response and the outward-facing microphone to inward-facing microphone transfer function in an external storage location.

6. The method of claim 5, wherein the external storage location includes cloud storage.

7. The method of claim 1, further comprising wirelessly communicating with an external device to transfer data to or from the external device.

8. The method of claim 7, wherein wirelessly communicating with the external device includes using a Bluetooth® or Bluetooth® Low Energy (BLE) transceiver.

9. The method of claim 7, wherein wirelessly communicating with the external device includes wirelessly communication with a smart phone.

10. The method of claim 1, wherein the hearing device includes a hearing aid.

11. A hearing device, comprising:

a receiver;

an inward-facing microphone;

an outward-facing microphone;

a memory; and one or more processors programmed to:

measure a receiver-to-inward-facing microphone response during an in-situ calibration stage for the hearing device;

estimate a receiver-to-eardrum transfer function using the measured receiver-to-inward-facing microphone response;

measure an outward-facing microphone to inward-facing microphone transfer function for an external noise sound field during run-time operation of the hearing device;

estimate an inward-facing microphone to eardrum transformation for the external noise sound field in the inward-facing microphone using the measured outward-facing microphone to inward-facing microphone transfer function;

compute an ANC controller using the estimated receiver-to-eardrum transfer function and the estimated inward-facing microphone to eardrum transformation; and cancel acoustic noise for the hearing device using the ANC controller.

12. The hearing device of claim 11, wherein the receiver-to-inward-facing microphone response and the outward-facing microphone to inward-facing microphone transfer function are logged in an external storage location.

13. The hearing device of claim 12, wherein the external storage location includes cloud storage.

14. The hearing device of claim 11, further comprising a wireless transceiver configured to communicate with an external device.

15. The hearing device of claim 14, wherein the wireless transceiver includes a Bluetooth® or Bluetooth® Low Energy (BLE) transceiver.

16. The hearing device of claim 14, wherein the external device includes a smart phone.

17. The hearing device of claim 11, wherein the hearing device includes a hearing aid.

18. The hearing device of claim 11, wherein, to compute the ANC controller, the one or more processors are programmed to use a computed variability of the estimated receiver-to-eardrum transfer function and the estimated inward-facing microphone to eardrum transformation.

19. The hearing device of claim 11, wherein the one or more processors are further programmed to:

update internal models of acoustic paths within the hearing device using the estimated receiver-to-eardrum transfer function and the estimated inward-facing microphone to eardrum transformation.

20. A hearing device, comprising:

a receiver;

an inward-facing microphone;

an outward-facing microphone:

a memory; and one or more processors programmed to:

measure a receiver-to-inward-facing microphone response during an in-situ calibration stage for the hearing device;

estimate a receiver-to-eardrum transfer function using the measured receiver-to-inward-facing microphone response;

measure an outward-facing microphone to inward-facing microphone transfer function for an external noise sound field during run-time operation of the hearing device;

estimate an inward-facing microphone to eardrum transformation for the external noise sound field in the inward-facing microphone using the measured outward-facing microphone to inward-facing microphone transfer function;

compute an ANC controller using the estimated receiver-to-eardrum transfer function and the estimated inward-facing microphone to eardrum transformation and a computed variability of the estimated receiver-to-eardrum transfer function and the estimated inward-facing microphone to eardrum transformation;

cancel acoustic noise for the hearing device using the ANC controller; and update internal models of acoustic paths within the hearing device using the computed variability of the estimated receiver-to-eardrum transfer function and the estimated inward-facing microphone to eardrum transformation.

* * * * *